July 21, 1925.

H. W. TAYLOR 1,546,870

WINDING FOR DYNAMO ELECTRIC MACHINES

Filed May 8, 1922  3 Sheets-Sheet 1

Inventor:
Henry W. Taylor,
by Albert G. Davis
His Attorney

July 21, 1925.
H. W. TAYLOR
WINDING FOR DYNAMO ELECTRIC MACHINES
Filed May 8, 1922   3 Sheets-Sheet 2
1,546,870
Fig. 2.
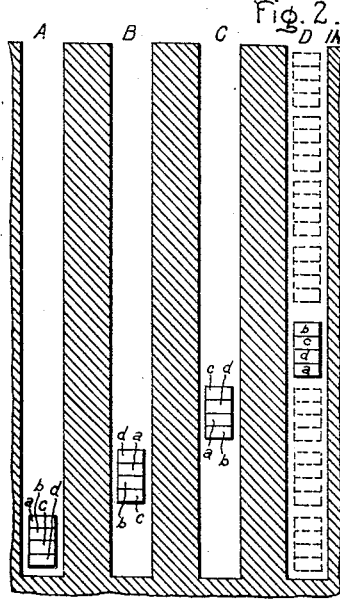
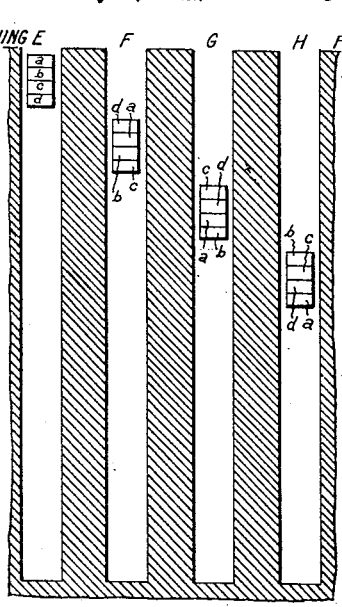
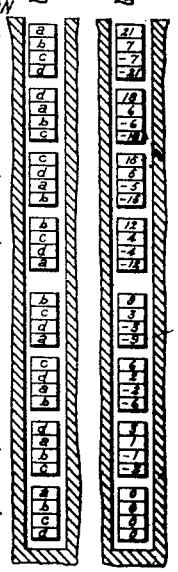
Fig. 3. Fig. 4.
Fig. 6.
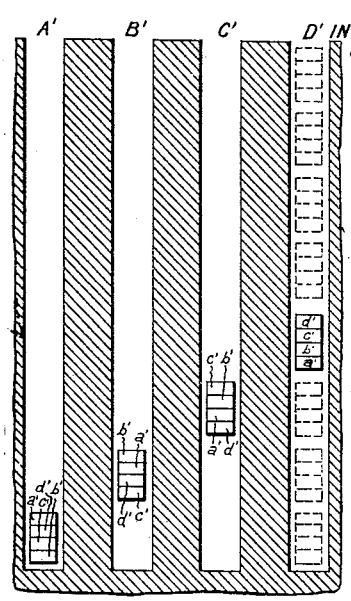
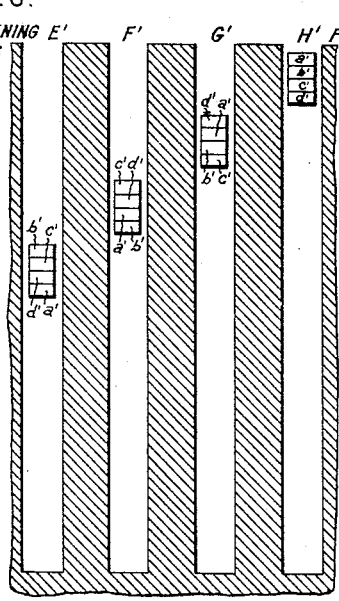
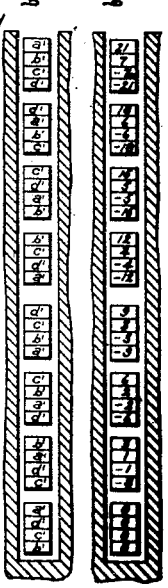
Fig. 7. Fig. 8.
Inventor:
Henry W. Taylor,
by *Albert G. Davis*
His Attorney Patented July 21, 1925.

1,546,870

UNITED STATES PATENT OFFICE.

HENRY WILLIAM TAYLOR, OF OLD BILTON, ENGLAND, ASSIGNOR TO GENERAL ELECTRIC COMPANY, A CORPORATION OF NEW YORK.

WINDING FOR DYNAMO-ELECTRIC MACHINES.

Application filed May 8, 1922. Serial No. 559,320.

*To all whom it may concern:*

Be it known that I, HENRY WILLIAM TAYLOR, a subject of the King of Great Britain, residing at Old Bilton, in the county of Warwickshire, England, have invented certain new and useful Improvements in Windings for Dynamo-Electric Machines, of which the following is a specification.

The present invention relates to dynamo electric machines, and more particularly to armature windings for alternating current machines, and is an improvement on the windings of prior patent to Taylor and Clough No. 1,390,064, dated September 6, 1921.

In this prior patent, a form of winding for an alternating current dynamo electric machine is described in which the conductors are divided into sections equal to the number of coils in the winding, the sections being insulated continuously throughout the winding, and in which the sections of the conductors are further subdivided into subsections, the subsections being also continuously insulated from one another throughout the winding, the position of each section as a whole being transposed within the conductor in passing from one turn to the next, and the position of each subsection within its section being also transposed in passing from one turn to the next. In this form of winding set forth in the above-mentioned patent, parasitic current between the subsections was considerably reduced.

Figure 1:
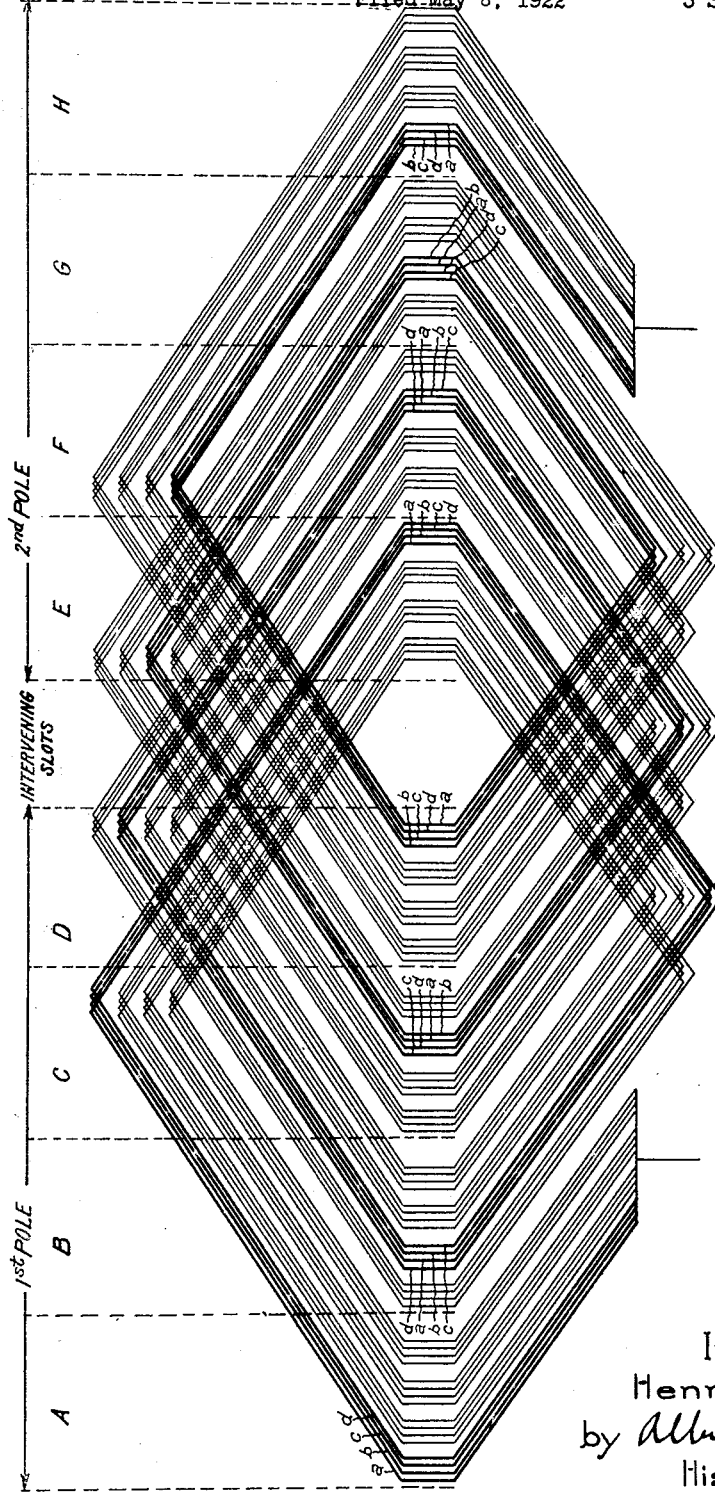
Figure 5:
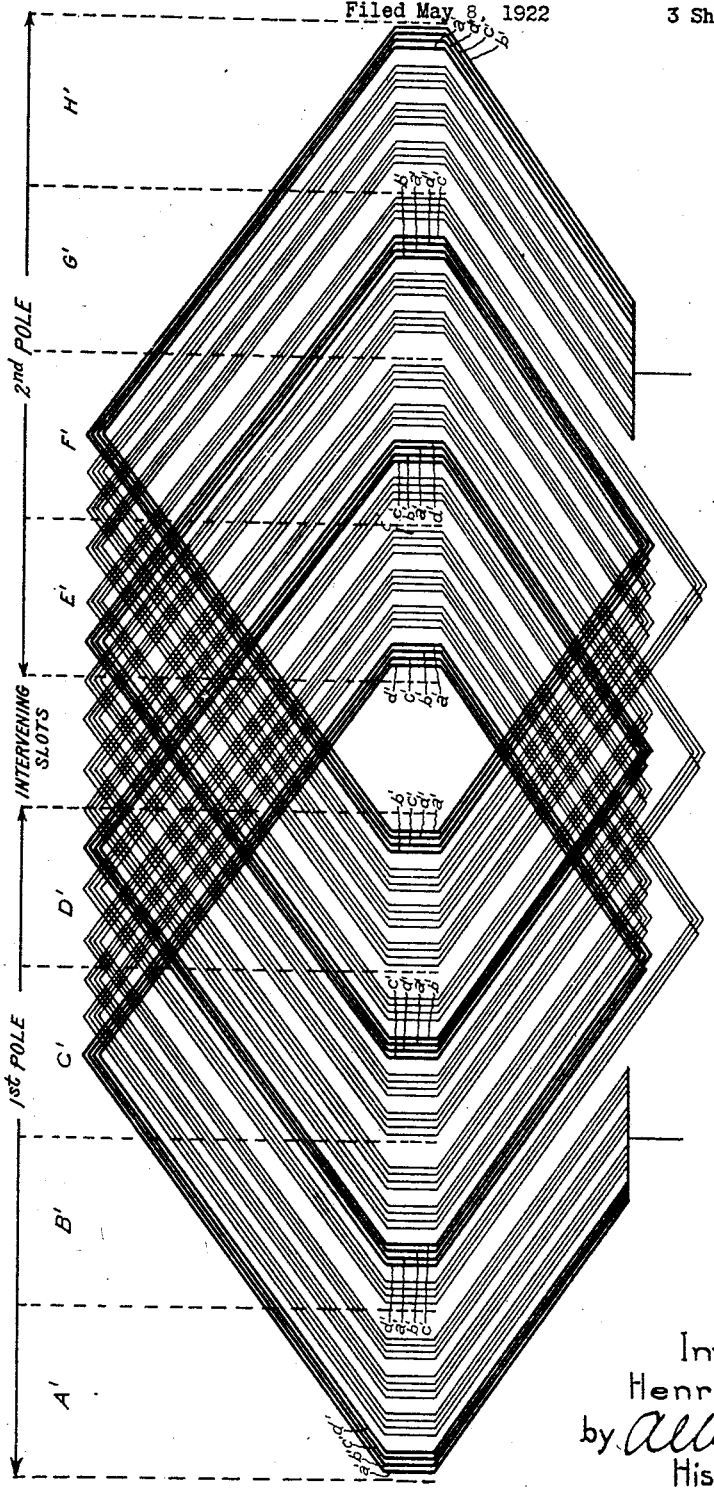

The object of the present invention is to substantially eliminate the parasitic current between the subsections in each section. The various features of novelty which characterize my invention are pointed out with particularity in the claims annexed to and forming a part of this specification. For a better understanding of my invention, reference may be had to the following description taken in connection with the accompanying drawings, in which Fig. 1 is a full development of a winding in accordance with my invention; Fig. 2 represents diagrammatically the arrangement of the subsections of one of the sections of the winding of Fig. 1 in the armature slots which contain a complete winding; Fig. 3 shows the sections redrawn as in a single slot; Fig. 4 is a figure similar to Fig. 3 giving the value of the average parasitic voltage in each subsection for the purpose of calculating the accumulated parasitic voltage between the subsections throughout the winding; Fig. 5 is a view similar to Fig. 1 of a modification of a winding in accordance with my invention; Fig. 6 is a view similar to Fig. 2 of the winding of Fig. 5; and Figs. 7 and 8 are views similar to Figs. 3 and 4 of the winding of Fig. 5.

Referring to Figs. 1 to 4, A to H represent a series of armature slots, slots A to D being located beneath one field pole and slots E to H being located beneath a pole of opposite polarity. The armature winding is located in these slots. It is divided into four sections and each section is divided into a number of subsections equal to the number of sections, that is, into four subsections, indicated as $a$, $b$, $c$ and $d$. In Fig. 1, the subsections belonging to one of the sections have been shown in thick lines throughout the winding, so that it may be more clearly seen that the sections are successively transposed as regards the order they may occupy each position in the conductor once throughout the winding. In this way circulating currents between sections are entirely eliminated in the manner set forth in Patent No. 1,390,064, referred to above.

Furthermore it will be noticed, more particularly with reference to Fig. 2, that the order of the subsections is transposed within the section throughout the winding.

Furthermore it will be noticed that the section occupying position 1 in the slot, that is, at the top of the top conductor, is connected without reversal of the order of the subsections to position 8 in the slot, that is, to the bottom of the bottom conductor. In accordance with the explanation of the intensities of the constant flux elements in different slot positions given in the Patent No. 1,390,064, referred to above, it will be observed that the total constant flux elements linking the subsections of any section when it occupies these positions in one turn of the winding will be 0+7=7. Similarly it will be observed that the section occupying position 2 in the slot is connected without reversal of the order of the subsections to the section occupying position 7 in the slot, so that the total constant flux elements linking the subsections of any section when it occupies these positions will be 1+6=7. Similarly it will be observed, that the total constant flux elements linking the subsections of any section when it occupies positions 3 and 6 in the slot to make a complete turn, and when it occupies positions 4 and 5 in the slot to make a complete turn, is in all cases 7.

Coming now to the elimination of the circulating eddy currents between subsections, the various sections are shown in Fig. 3 as if they were arranged in a single slot, and in accordance with the explanation given in the above mentioned Patent No. 1,390,064, the value of the parasitic voltage generated in each subsection is indicated in arbitrary units in Fig. 4.

In order to determine the total parasitic voltage between the various subsections of any section as the conductor passes through the whole length of the winding, it is now only necessary to add up the figures shown in Fig. 4 which are opposite to the subsections in the various positions in the slot in Fig. 3. For example, taking the case of subsection $a$; this appears at the top in position 1, second from the top in position 2, third from the top in position 3, at the bottom in positions 4 and 5, third from the top in position 6, second from the top in position 7 and again at the top in position 8. Therefore the total parasitic voltage corresponding to subsection $a$ throughout the winding is the following in the units shown in Fig. 4:

$$21+6-5-12-9-2+1+0=0$$

and similarly for subsection $b$ the total parasitic voltage is:

$$7-6-15+12+9-6-1+0=0$$

Similarly the other subsections will likewise accumulate a net parasitic voltage of zero in passing throughout the winding, with the result that there will be no parasitic voltage between the subsections and consequently circulating eddy currents between them are entirely eliminated.

In the modified form of winding shown in Figs. 5 to 8, A' to H' represent a series of armature slots, slots A' to D' being located beneath one field pole and slots E' to H' being located beneath a pole of opposite polarity. In this winding there are again four turns in the winding and each conductor is divided into as many sub-sections as there are sections, that is, into four sections and each section into four subsections, indicated as $a'$, $b'$, $c'$ and $d'$. Also in Fig. 5, the subsections constituting one section have been shown throughout the winding in somewhat thicker lines than the rest of the sections in order that it may be more clearly seen that the sections are successively transposed as regards the order they may occupy each position in the conductor once throughout the winding. It is also clear from Figs. 5 and 6 how the positions of the subsections in the sections are changed in passing through the winding.

Further it will be noticed that the section occupying position 1 in the slot, that is, the section at the top of the top conductor is connected to a section at position 5 in the slot, that is, at the top of the bottom conductor and that in passing from one slot to the other, the order of the subsections in the section is reversed. By reasoning similar to that given in the above mentioned Patent No. 1,390,064 with reference to constant flux elements in different positions in the slot, it will be seen that the total number of constant elements of flux linking the subsections of any section when the latter occupies these two positions to make a complete turn will be 7—3=4. Similarly, the section occupying position 2 in the slot is connected with reversal of the order of the subsections to a section occupying position 6 in the slot, so that the total constant elements of flux linking the subsections of any section when the latter occupies these two positions to make a complete turn will be 6—2=4. Further, it is easily seen that the total constant elements of flux linking with the subsections of any section when it occupies positions 3 and 7 in the slot to make a complete turn, and when it occupies positions 4 and 8 in the slot to make a complete turn, is in all cases 4.

Considering now, the eddy currents circulating between subsections, the various sections are shown in Fig. 7 as if they were arranged in a single slot, and, in the same fashion as dealt with in the said Patent No. 1,390,064, the value of the parasitic voltage generated in each subsection is indicated in arbitrary units in Fig. 8.

In order to determine the total parasitic voltage between the various subsections of any section as the conductor progresses through the whole length of the winding, it is now only necessary to add up the figures given in Fig. 8 opposite to the subsections in the various positions in the slot in Fig. 7. For example, taking the case of subsection $a'$; this appears at the top in position 1, second from the top in position 2, third from the top in position 3, at the bottom in positions 4 and 5, third from the top in position 6, second from the top in position 7 and again at the top in position 8. Therefore, exactly as described in connection with Figs. 3 and 4, the total parasitic voltage for subsection $a'$ throughout the winding in the units shown in Fig. 8 is the following:

$$21+6-5-12-9-2+1+0=0$$

In a similar fashion, the total parasitic voltage in the case of subsection $b'$ is:

$$7-6-15+12-3+2+3+0=0$$

The other subsections will likewise accumulate a net parasitic voltage of zero in progressing through the winding, with the result that in this form of winding also there will be no parasitic voltage between the subsections and consequently circulating eddy currents between them are entirely eliminated.

It will be noted that in both arrangements of windings shown in the drawings, the order of the subsections are necessarily transferred in the sections occupying successive positions in the top half of the slots, and the order of the subsections is successively transferred in the sections occupying successive positions in the bottom half of the slots.

What I claim as new and desire to secure by Letters Patent of the United States, is:—

1. An armature provided with slots and a winding located therein, said winding comprising a plurality of sections, each section comprising a plurality of subsections, the number of sub-sections being equal to the number of sections, said sections and subsections being each insulated from one another throughout the winding and connected at their ends in multiple, each section from one end to the other of said winding occupying all positions within a slot and the order of the subsections within each section being such that the accumulated elements of flux linking each subsection which tend to cause current to flow between the subsections is the same for the complete winding.

2. An armature provided with slots and a winding located therein, said winding comprising a plurality of sections, each section comprising a plurality of subsections, the number of subsections being equal to the number of sections, said sections and subsections being each insulated from one another throughout the winding and connected at their ends in multiple, each section from one end to the other of said winding occupying all positions within a slot and the order of the subsections within each section being such that the accumulated elements of flux linking each subsection which tend to cause current to flow between the subsections is the same for the complete winding.

3. An armature provided with slots and a winding located therein, said winding comprising a plurality of sections, each section comprising a plurality of subsections, the number of subsections being equal to the number of sections, said sections and subsections each being insulated from one another throughout the windings and connected at their ends in multiple, the subsections of a section occupying the top position in one half turn of the winding being connected without reversal of the order of the subsections to the subsections of the section occupying the bottom position of the second half turn and the subsections of the section occupying the second position from the top in one half turn being connected without reversal of the order of the subsections to the subsections of the section occupying the second position from the bottom in the next half turn, which relation is continued throughout the winding, the order of the subsections of each section being different in different turns of the winding.

4. An armature provided with slots and a winding located therein, said winding comprising a plurality of sections, each section comprising a plurality of subsections, the number of subsections being equal to the number of sections, said sections and subsections being each insulated from one another throughout the windings and connected at their ends in multiple, each section from one end to the other of said winding occupying all positions within a slot, the order of the subsections being successively transferred in the sections occupying successive positions in the top half of the slots, and the order of the subsections being successively transferred in the sections occupying successive positions in the bottom half of the slots.

In witness whereof, I have hereunto set my hand this twentieth day of April, 1922.

HENRY WILLIAM TAYLOR.

Witnesses:
J. A. FOSTER,
DOROTHY WHITE.